(12) United States Patent
Roberts et al.

(10) Patent No.: US 8,091,602 B2
(45) Date of Patent: Jan. 10, 2012

(54) TRANSFER RING HAVING ADVANTAGED CAM FOLLOWER-CAMMING GROOVE ASPECT AND METHOD

(75) Inventors: Clark A. Roberts, Maryville, TN (US); Sean E. Howley, Maryville, TN (US)

(73) Assignee: Davian Enterprises, LLC, Greenback, TN (US)

( * ) Notice: Subject to any disclaimer, the term of this patent is extended or adjusted under 35 U.S.C. 154(b) by 764 days.

(21) Appl. No.: 12/166,564

(22) Filed: Jul. 2, 2008

(65) Prior Publication Data

US 2010/0000658 A1 Jan. 7, 2010

(51) Int. Cl.
*B29D 30/26* (2006.01)

(52) U.S. Cl. ..................... 156/406.2; 156/126

(58) Field of Classification Search .......... 156/126, 156/406.2, 417, 420; 425/38, 360; 249/162; 294/95, 97, 81.61, 86.3, 110.2, 113, 114, 294/116
See application file for complete search history.

(56) References Cited

U.S. PATENT DOCUMENTS

| | | | | |
|---|---|---|---|---|
| 1,750,728 A * | 3/1930 | Robison | ............. | 294/86.22 |
| 4,469,546 A * | 9/1984 | Klose et al. | ............. | 156/406.2 |
| 4,519,279 A * | 5/1985 | Ruggeri | ............. | 82/162 |
| 5,071,498 A * | 12/1991 | Nishiide et al. | ............. | 156/132 |
| 5,380,384 A * | 1/1995 | Tokunaga et al. | ............. | 156/111 |
| 5,441,587 A | 8/1995 | Byerley | | |
| 5,558,733 A | 9/1996 | Byerley | | |
| 5,635,016 A | 6/1997 | Byerley | | |
| 5,709,768 A * | 1/1998 | Byerley | ............. | 156/406.2 |
| 5,735,995 A * | 4/1998 | Bull et al. | ............. | 156/398 |
| 6,571,682 B2 | 6/2003 | Roberts | | |
| 2003/0197389 A1* | 10/2003 | Moilanen et al. | ............. | 294/88 |

* cited by examiner

*Primary Examiner* — Geoffrey L Knable
(74) *Attorney, Agent, or Firm* — Pitts, Lake & Bell, PC

(57) ABSTRACT

A transfer ring especially suitable for use in the manufacture of vehicle tires including a skeletal cylindrical cage which houses an oscillatable circular drive member therewithin. The drive member includes a plurality of cam followers disposed about the outer perimeter thereof and which operatively engage respective camming grooves defined in each of a plurality of hinged driven links which are individually hingedly mounted internally of the cage about the outer perimeter of the cage. Each driven link includes an inboard end hinged within the cage and an outboard end having an articulating shoe mounted thereon. The shoes on the several driven links are interconnected to provide like simultaneous substantially equal articulative and rotational movement of the shoes radially inwardly or radially outwardly of the cage upon rotational movement of the drive member and resultant rotational movement of the hinged driven links effected through the cam followers and camming grooves of the driven links.

10 Claims, 15 Drawing Sheets

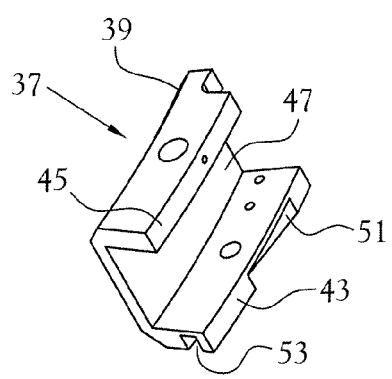
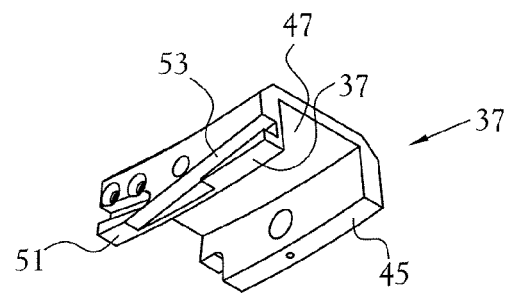
Fig.11    Fig.12
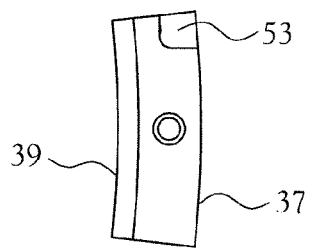
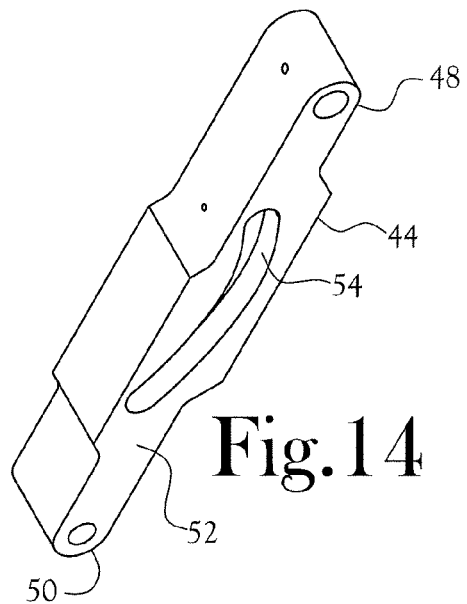
Fig.13    Fig.14
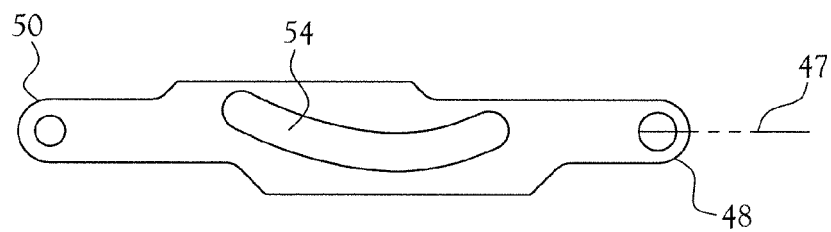
Fig.15

TRANSFER RING HAVING ADVANTAGED CAM FOLLOWER-CAMMING GROOVE ASPECT AND METHOD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention relates to devices that are particularly useful in the manufacture of vehicle tries and relates, more particularly, to apparatus defining an inner circumference suitable to serve as a circular surface to grasp the outer circumference of a circular, tubular or round object, usually for purposes of transferring of the grasped object between first and second locations. More specifically, this invention relates to an improved transfer ring, useful in the manufacture of vehicle tires.

The manufacture of a vehicle tire commonly includes the steps of forming a tire, carcass, forming a toroidal belt and tread portion of the tire separately of the carcass, and thereafter marrying the belt and tread portion of the tire to the carcass to form a "green" tire. The green tire is thereafter treated to form the tread and various other features of the tire. Other supplementary steps, such as stitching may be performed during the course of or following one or more of the aforementioned steps.

2. Description of the Related Art

As seen in FIG. 1, formation of a belt and tread portion of the tire is accomplished on a belt and tread drum 12 such drum has an outer cylindrical surface, or circumference, about which one or more layers of the tire belt material (comprising for example, reinforcement cords embedded in a polymeric binder) are laid to define the belt and tread package. The circumference of such drum is preferably capable of expanding and contracting to, for example, accommodate the removal from such drum of a completed belt and tread package which is essentially nonexpandable radially, but which is flexible to the extent that when unsupported, the toroidal package will sag under the influence of gravity. Also, desirably, the adjustable circumference of the belt and tread drum enables a single drum to be used to form belt and tread packages of alternative diameters.

In the manufacture of vehicle tires, the drum upon which a carcass is formed is somewhat similar to the drum upon which the belt and tread package is formed. Subsequent to the formation of the carcass such carcass commonly is transferred to an expansion drum 14 and while the carcass remains on its forming drum, it is overlaid with a toroidal belt and tread "package".

In some instances, after the carcass has been formed, it may be transferred to a second stage drum, employing a transfer ring, and held thereon while a belt and tread package is transferred from the belt and tread drum onto the outer circumference of the carcass, also employing a transfer ring. Thereafter, the belt and tread package is married to the carcass.

Desirably a transfer ring as employed in the vehicle tire manufacturing industry, incorporates a maximum range of adjustability of diameter of the transfer ring such that the transfer ring can be used in the manufacture of a relatively large range of vehicle tire sizes (diameters). In order for the individual shoes of a transfer ring to move radially outward, the mechanism for mounting each of the shoes includes a hinge connection of the shoe to the mechanism which moves the shoe generally radial, inwardly and outwardly. This hinged connection permits the shoe to rotate freely about the hinge connection. In applicant's U.S. Pat. No. 5,635,016, rotation of the sections of multi-sectional arcuate segment (i.e. shoe) is controlled by guide plates attached to the sections of adjacent shoes and which interact with pin means on the sections of adjacent shoes to aid in maintaining the collective circular attitude of the sections of the several shoes as the diameter of the circle collectively defined by the shoes is increased or decreased in diameter. The fabrication, installation and maintenance of this type of interconnection of the adjacent shoes of the transfer ring or drum, however, are time consuming and expensive.

Further, applicant's U.S. Pat. No. 5,709,768, there is disclosed a transfer ring wherein the plurality of shoes are mounted on the outboard ends of respective arms, whose respective inboard ends are rotatably mounted on a fixedly mounted ring. The inboard end of each arm further includes a rigid bracket element which in turn, is included in a "train" of such bracket elements. The geometry and mounting aspects of these bracket elements are chosen such that upon the application of a linear force to the train of bracket elements, the arms are caused to rotate about their inboard mountings with resultant accurate movement of the outboard ends of the arms (and the shoe attached thereto) inwardly and outwardly of the longitudinal centerline of the transfer ring. Among other things, this device is limited as to the directionality of the path of the inward and outward movement of the shoes on the arms, and lacks capability for minimization of the force transferred from the shoes to the power source associated with the device.

SUMMARY OF INVENTION

In accordance with one aspect of the present invention, there is provided a transfer ring especially suitable for use in the manufacture of vehicle tires. This transfer ring includes a skeletal cylindrical cage which houses an oscillatable circular drive member therewithin. The drive member includes a plurality of cam followers disposed about the outer perimeter thereof and which operatively engage respective camming grooves defined in each of a plurality of hinged driven links which are individually hingedly mounted internally of the cage about the outer perimeter of the cage. Each driven link includes an inboard end hinged within the cage and an outboard end having an articulating shoe mounted thereon. The shoes on the several driven links are interconnected to provide like simultaneous substantially equal articulative and rotational movement of the shoes radially inwardly or radially outwardly of the cage upon rotational movement of the drive member and resultant rotational movement of the hinged driven links effected through the cam followers and camming grooves of the driven links.

BRIEF DESCRIPTION OF THE DRAWINGS

FIG. 11 is a perspective representation of a shoe element of one embodiment of the transfer ring of the present invention;

FIG. 12 is a reversed perspective representation of the shoe element depicted in FIG. 11;

FIG. 13 is an end elevation view of the shoe element depicted in FIG. 11;

FIG. 14 is a perspective representation of one embodiment of a driven link element employed in a transfer ring of the present invention;

FIG. 15 is a side elevation view of the driven link depicted in FIG. 14;

DETAILED DESCRIPTION OF THE INVENTION

Figure 1:
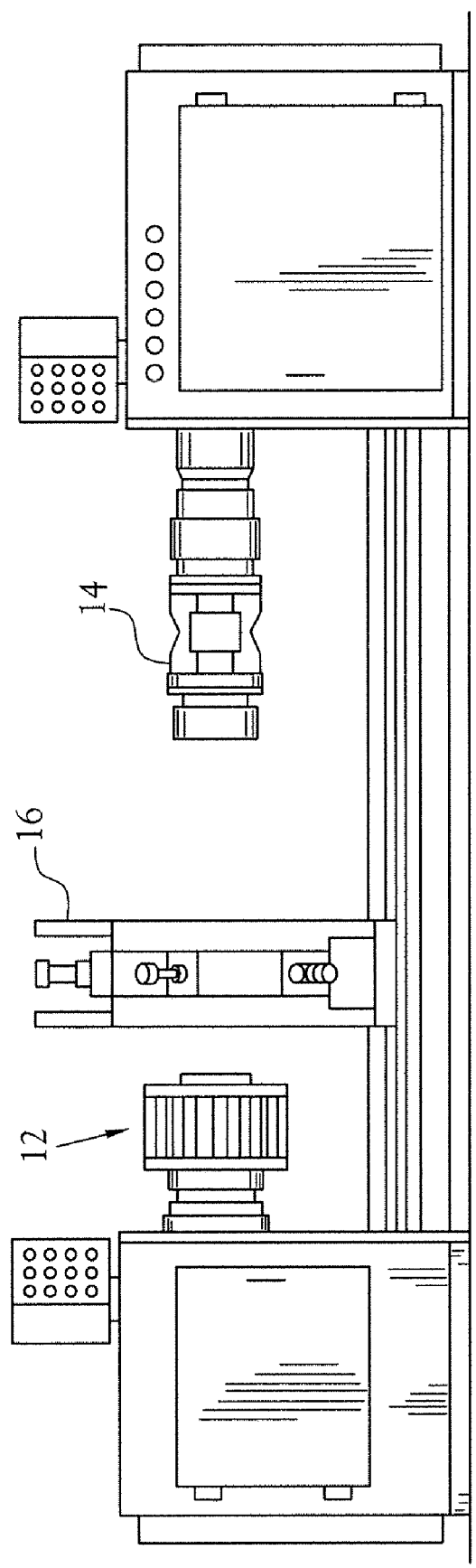
FIG. 1 is a schematic representation of a typical prior art vehicle tire forming system.

As depicted in the several Figures, and initially referring to FIGS. 2-6, in one embodiment, the present transfer ring 16 comprises first and second circular frame members 18 and 20, respectively disposed in fixed, registered, side by side, parallel spaced apart, relationship to one another. These circular frame members are of substantially the same inner and outer diameters and each preferably is of a generally rectangular cross-section (See FIGS. 2 and 8) having respective inner and outer opposite flat side surfaces 22, 26 and 24, 28, respectively.

A plurality of hinge pin connectors 30 extend between the first and second circular frame members at spaced apart locations about the respective perimeteral margins of the first and second circular frame members. Each hinge pin connector includes a longitudinal centerline 32, first and second opposite ends 34, 36 and is of a length adapted to rigidly retain the side by side parallel registered and spaced apart relationship of said first and second circular frame members thereby defining a skeletal cage 38 having an open space 40 between the first and second circular frame members. (See FIGS. 2-6). To this end, the first end 34 of each of the hinge pin connectors is mounted in the first circular frame member 18 at respective spaced apart locations about the outer perimeteral margin of the first circular frame member and projects therefrom toward the second circular frame member 20. The second end 36 of each of the hinge pin connectors is mounted in the second circular frame member 20 at selected spaced apart locations about the outer perimeteral margin of the second frame member, such spaced apart locations on the first circular frame member being in register with the spaced apart locations on the second circular frame member thereby defining a substantially rigid circular skeletal cage 38 having a central axis 42 and a substantially open space 40 defined therebetween.

Within the open space between the first and second frame members, there is disposed a circular drive member 43 in side by side, parallel relationship to the first circular frame member. This circular drive member includes a central axis which is coincident with the central axis 42 of the cage.

Within the open space defined between the first and second spaced apart circular frame members there are provided a plurality of driven links, 44. As seen in FIGS. 14, 15, each driven link is of an elongated geometry, having a longitudinal center line 46 and an inboard end 48. As seen in FIGS. 2-6, the outboard end 50 of each driven link 44 is hingedly mounted on a respective hinge pin connector 30 which extends between the first and second frame members. The inboard end 48 of each driven link 44 is free-floating and adapted to move generally radially in and out of the open space 40 defined between the first and second frame members when the driven links are rotated about their hinged ends with the skeletal cage.

Referring particularly to FIGS. 2, 3, 14 and 15, in accordance with one aspect of the present invention each of the driven links includes at least a first outer surface 52 facing inwardly of the circular skeletal cage. This first outer surface of each driven link is provided with an elongated curved camming groove 54 defined along a portion of the length of the first outer surface of each of the driven links. As further described hereinbelow, each camming groove is adapted to operatively receive therein one of a plurality of roller cam followers 56 exposed on the inboard side surface 58 of the circular drive member, whereby rotational movement of the circular drive member moves the cam followers along at least a portion of a circular path within the skeletal cage. This circular path is concentric with the central axis of the cage.

Figure 18:
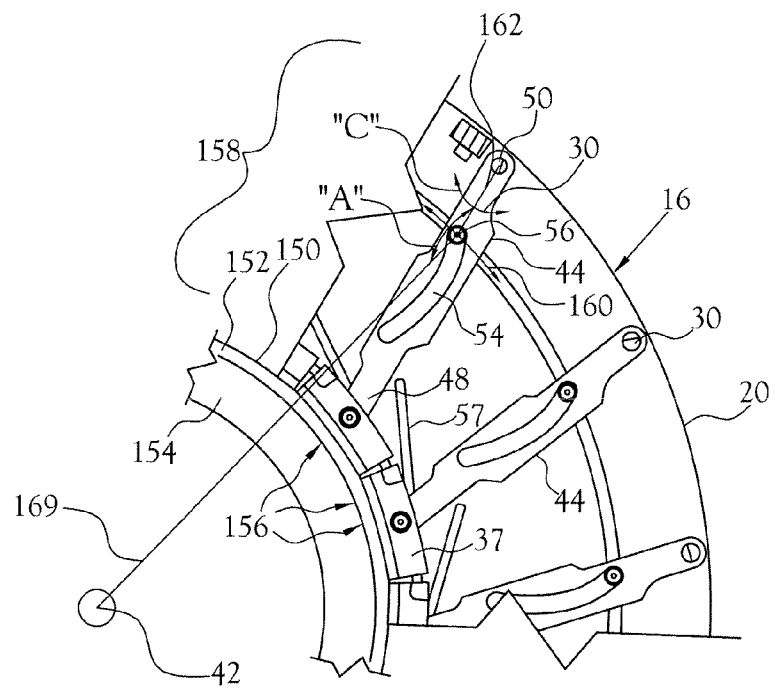
FIG. 18 is a partial cutaway side view of a portion of the transfer ring depicted in FIG. 2, taken generally along the line 18-18 of FIG. 2.

In the depicted embodiment, the curved camming groove is concave with the concavity facing the central axis of the cage when the driven links are disposed within their outmost expanded attitude (See FIG. 18). The length of the groove is chosen to provide for movement of a cam follower from one end of the groove to the opposite end of the groove when the circular drive member is rotated. In the depicted embodiment, the length of the curved camming groove determines the extent of permissible rotation of the circular drive member and is chosen to provide for the movement of driven links, hence their attached shoes, between the retracted position of the shoes within the cage and the fully expanded position of the shoes within the cage.

Referring specifically to FIGS. 2, 3, 5 and 11-13 the inboard end 48 of each of the driven links 44 has attached thereto an articulating shoe 37. Each of the plurality of shoes mounted on the inboard ends of the driven links includes an outer surface 39 facing substantially radially inwardly of the skeletal cage. In the depicted embodiment of each shoe, this outer surface is slightly concave along its length dimension so as to define a portion of a collectively-established circular surface 41 adapted to surround and grasp an object, especially for transfer of such object between separated locations.

Figure 5:
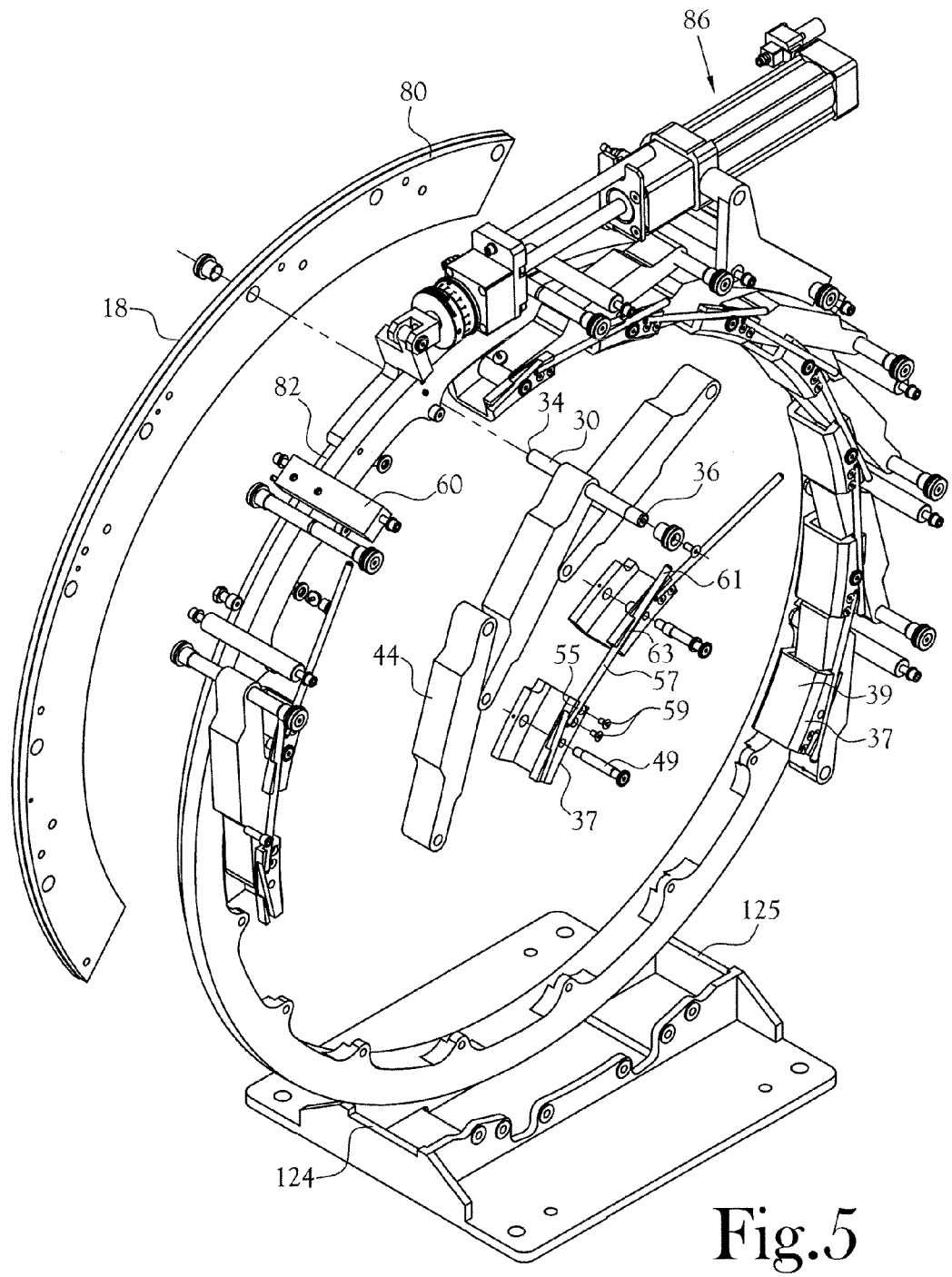
FIG. 5 is a further partially exploded perspective view of one embodiment of a transfer ring of the present invention.
Figure 6:
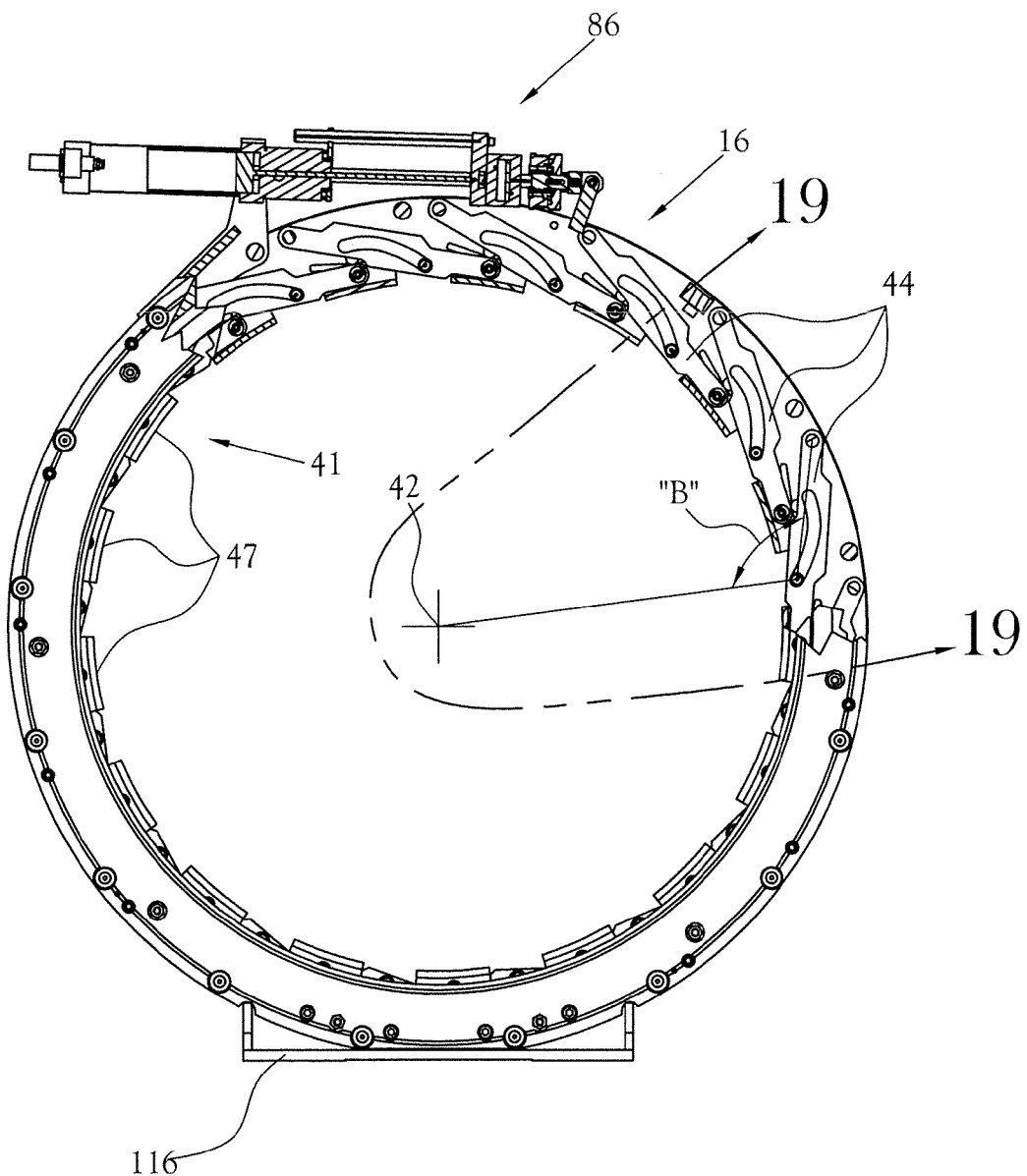
FIG. 6 is a side elevation view, partly cutaway, of one embodiment of a transfer ring depicting various aspects of the present invention.

Each shoe further includes first and second side walls 43, 45, respectively, which are upstanding from the inboard surface 47 of the shoe. As seen in FIG. 5, the outboard end 50 of a respective driven link 44 resides between such opposite sides of the shoe which is articulatingly mounted to the outboard end of the driven link 44 as by a pivot pin 49 which extends through the sides of the shoe and the driven link. As so mounted, each shoe is carried substantially radially inwardly or outwardly of the cylindrical skeletal cage upon rotation of their respective driven link about its pivot pin connector.

Adjustability of the limits of articulation of each shoe may be provided to change the range of articulation of a shoe about its pivot pin, thereby giving a user the ability to change the range of grasping diameters possible for a given degree of rotation of the drive ring.

As seen in FIGS. 5 and 11-13, each shoe further includes first and second separate grooves 51, 53 defined along its outboard side wall 43. A first one 51 of the grooves includes a blind end and opens toward an adjacent shoe. A second groove 53 is provided along the same side of the shoe as the first groove, but is open at both ends. The first groove is adapted to receive therein a first end 55 of a rigid rod 57 of a length sufficient to span two adjacent ones of the shoes. Such first end of the rod is anchored within this first groove as by flat head screws 59. The opposite second end 61 of each rod extends into the open-ended groove 63 of an adjacent shoe where such second end of the rod is slidably held within such open-ended groove. By this means, the shoes are interconnected in a train fashion so that articulation of the shoes upon radial movement of the outboard end of the driven links is simultaneous and of like direction and extent, thereby ensuring continued retention of the circularity of orientation of the concave collectively-established, outboard grasping surfaces of the plurality of shoes over their full extent of motion radially inwardly or outwardly of the cage.

Collectively, within a given range of grasping diameters of the transfer ring of the present invention, the outer surfaces of the shoes define a circular grasping surface having a diameter which is selectable by selection of the extent of rotation of the circular drive member.

As seen in FIGS. 2, 4, 5, 8, further integration of the first and second circular frame members 18, 20 is ensured by means of plurality of cross plates 60 which are connectively interposed between the first and second circular frame members at spaced apart locations about the outer circumference of the cage. Each cross plate includes first and second opposite ends 62, 64, the first end 62 of which is anchored to the outer perimeteral margin of the first circular frame member 18 and the second end 64 of which is anchored to the outer perimeteral margin of the second circular frame member 20.

Figure 8:
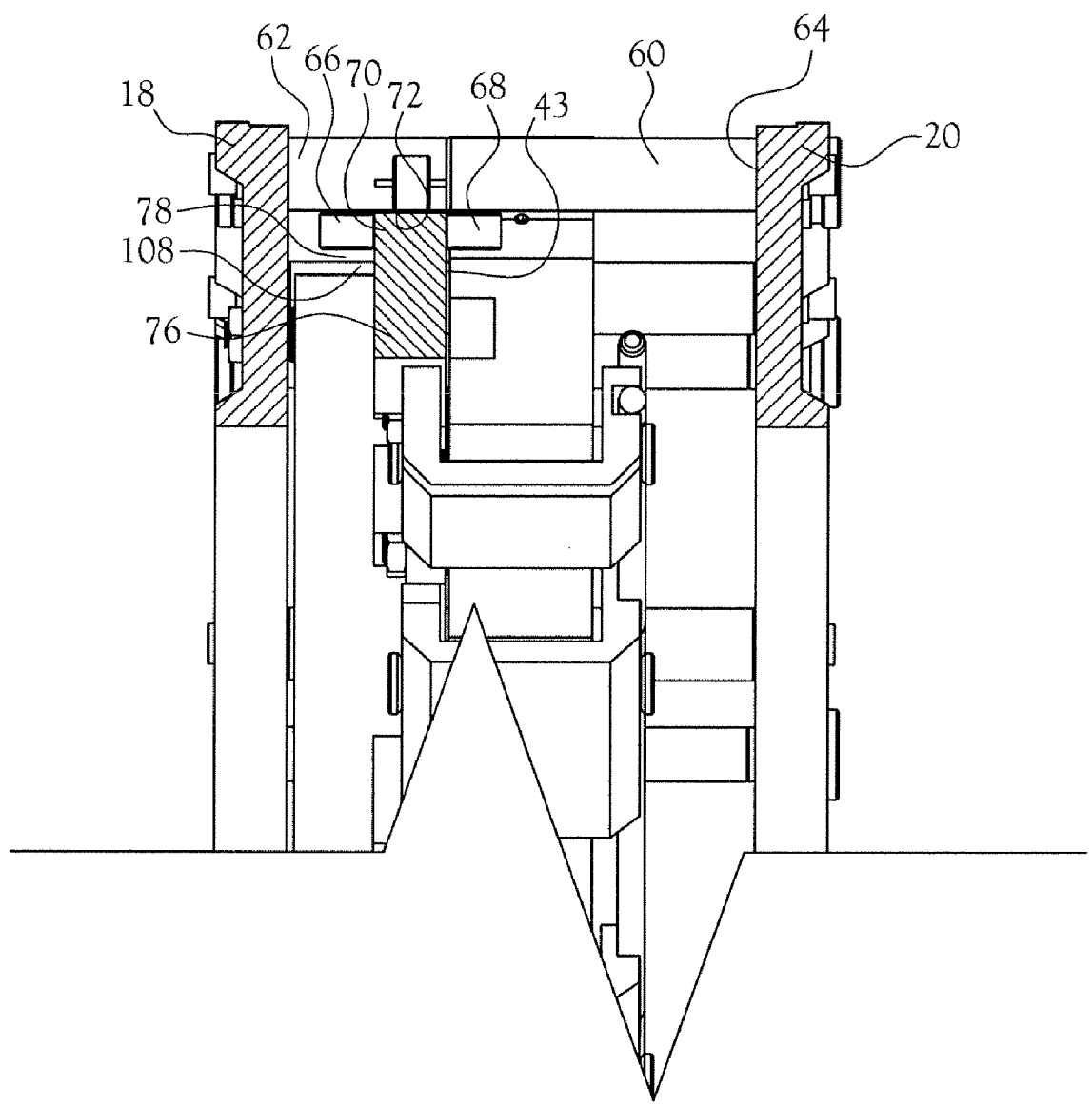
FIG. 8 is a partial sectional view taken generally along the line 8-8 of FIG. 3.
Figure 9:
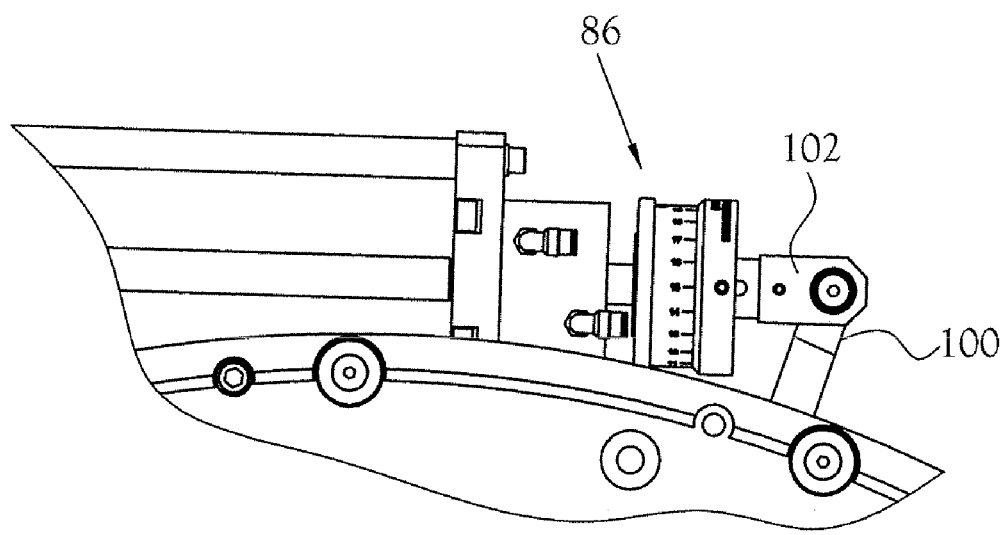
FIG. 9 is a side elevation cutaway view taken generally along line 9-9 of FIG. 3.
Figure 10:
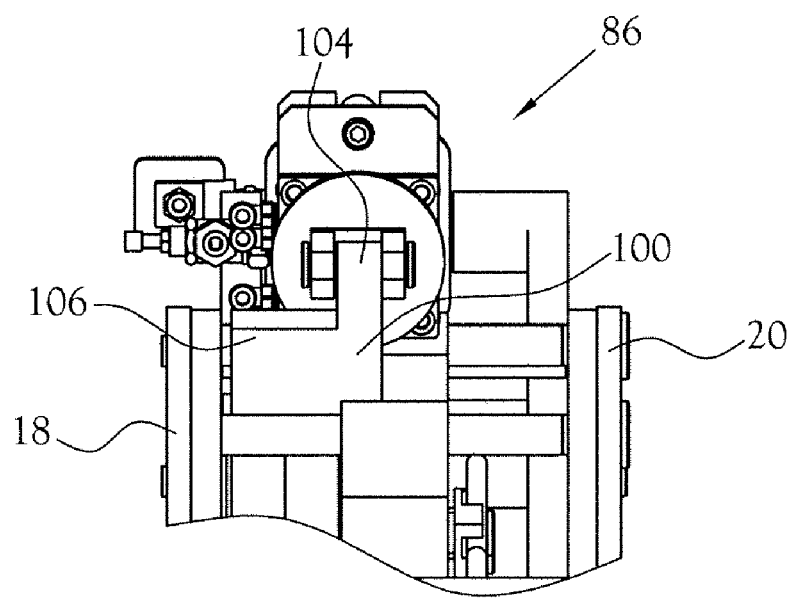
FIG. 10 is a front elevation cutaway view taken generally along the line 10-10 of FIG. 3.

As depicted in FIG. 8, generally intermediate the opposite ends of each cross plate, there are mounted first and second spaced apart roller guides 66, 68 which lie in a plane parallel to the plane of the cross plate and which project from the inboard surface of the cross plate to define a passageway 70, therebetween.

Figure 7:
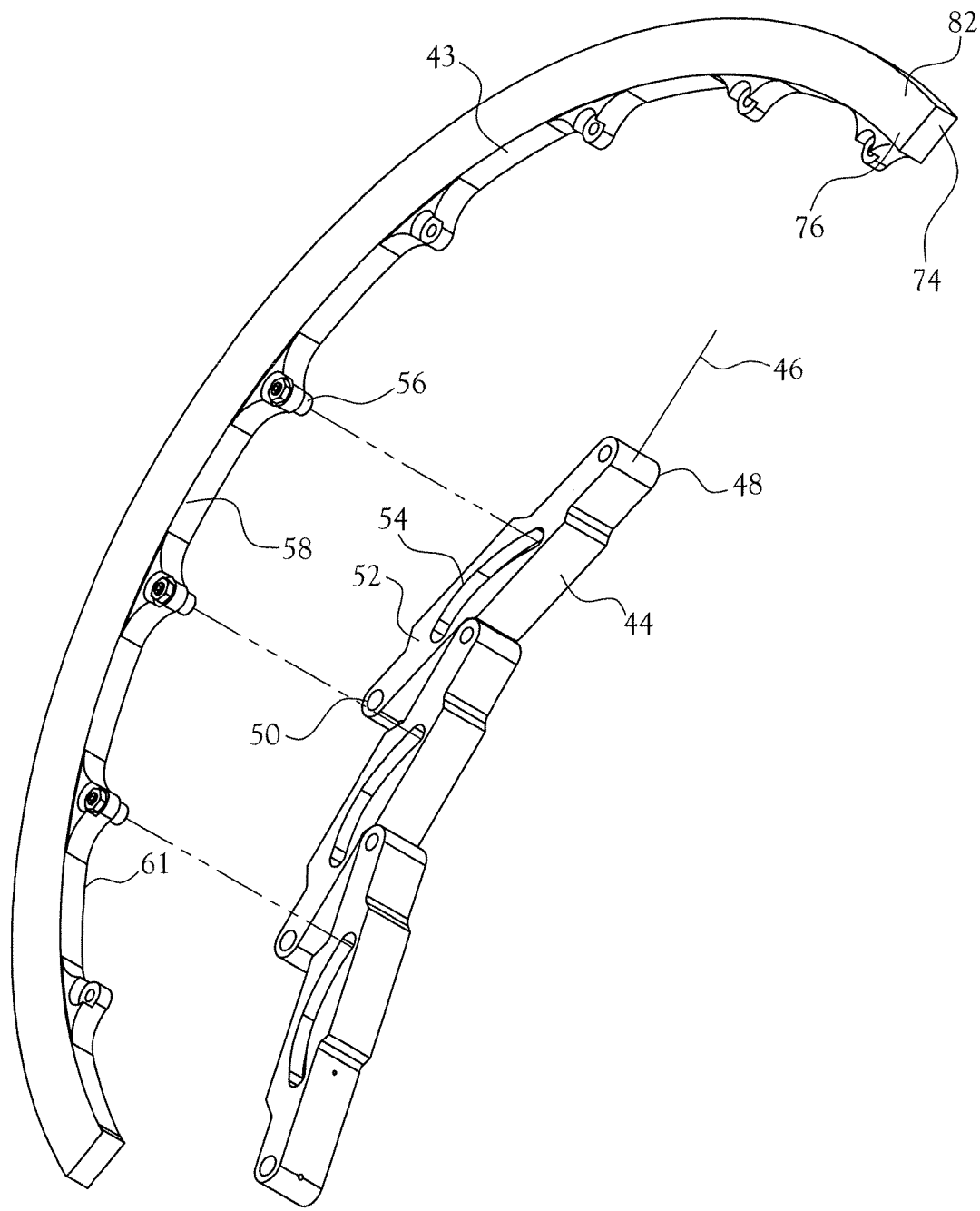
FIG. 7 is an exploded fragmentary view of one embodiment of a transfer ring depicting the cam-cam follower aspect of the present invention.

Further as seen in FIGS. 7 and 8, the circular drive member 43 is of a generally rectangular shaped cross section having smooth opposite outer side surfaces. As mounted within the circular cage, the circular drive member is disposed between, and rotatably retained by, the passageway defined between the first and second roller guides that are mounted on the inner surface of each cross plate.

As seen in FIG. 8, there is mounted on each cross number 60, a further roller adapted to engage the outer circumference surface of the circular drive member. The several rollers on the several cross member function to retain the circular drive member concentric with the first and second forced member while the first and second roller guider function to maintain the circular drive member in parallel relationship to the first and second frame members.

In this manner, the mounting of the circular drive member within the interior of the cage provides for sliding, guided directional rotation clockwise or counterclockwise, of the circular drive member about the central axis 42 of the cage while being retained in its adjacent relationship to the non-rotatably mounted first and second frame members of the cage.

Referring to FIGS. 2, 5, 7, and 8, on the inner circumference surface 58 of the circular drive member there is provided a plurality of roller cam followers 56 which project laterally away from the inner side surface 61 of the circular drive member toward the plurality of driven links 44 which are pivotally mounted with the open annular space defined between the first and second frame members of the cage. In the depicted embodiment, there is provided one cam follower for engagement with each one of the driven links. It will thus be recognized that rotation of the circular drive member about its rotational axis, will cause all of the cam followers to move along a circular path simultaneously with the drive member. Since each cam follower 56 engages a camming groove 54 of a respective one of the driven links 44, rotation of the cam followers effects movement of the driven links about their hinged mounting to respective ones of the hinge pin connectors.

A power source 86 for effecting controlled rotation of the cylindrical drive member, in the depicted embodiment, includes a double-acting piston/cylinder device 86 which is mounted on the outer periphery of the first and second frame members as by one or more brackets 88. The piston/cylinder device may be powered by compressed fluid from a reservoir 90, the start, stop, duration and direction of flow of which is controlled by a conventional controller 92.

Whereas the depicted power source is of the piston/cylinder type, it will be recognized that other types of power sources may be employed.

Figure 16:
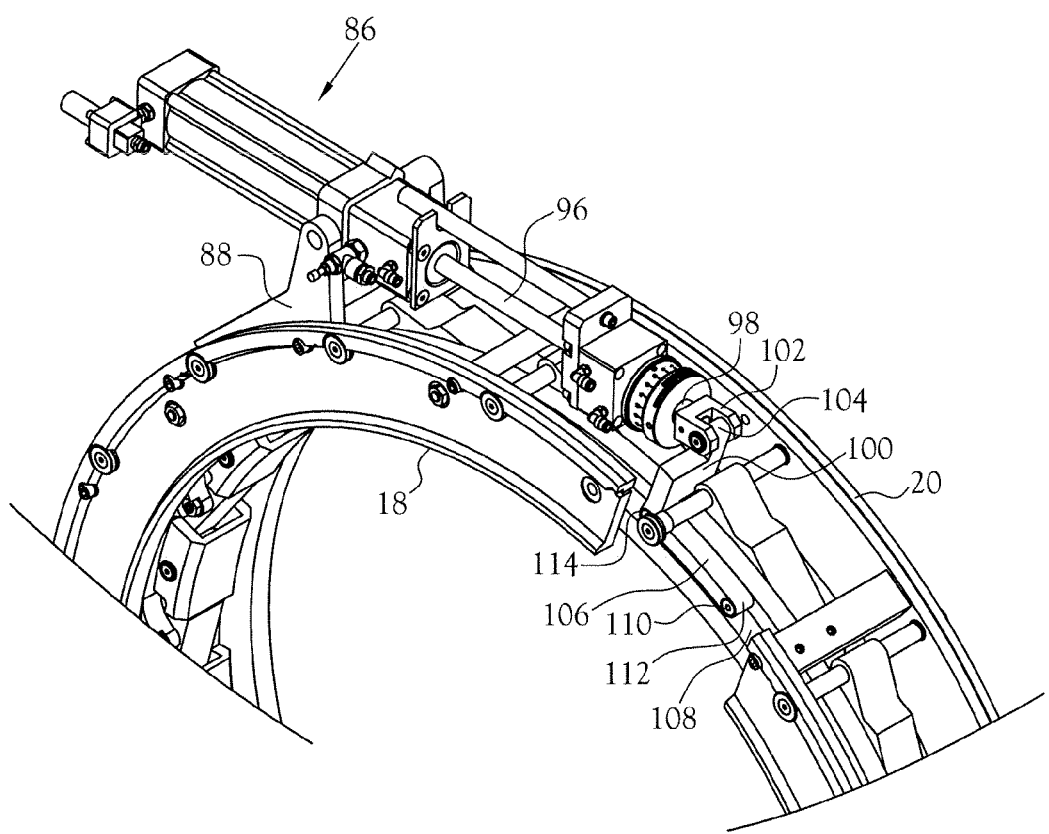
FIG. 16 is a partially cutaway view depicting a piston/cylinder power source mounted on a transfer ring and its connection to the circular drive member in one embodiment of the present invention.

As seen in FIGS. 2, 3, 5 and 16, the outboard end 98 of the piston rod 96 of the piston/cylinder device is attached to the first upstanding leg 74 of an L-shaped connector driven link 100 as by a clevis 102. As seen in FIG. 16, the second leg 106 of the connector driven link lies within a groove 108 defined in the outer peripheral surface of the circular drive member. The connector driven link is attached to the circular drive member as by common screws 110 located adjacent the outboard end 112 of the second leg of the connector driven link and adjacent the bend at the juncture 114 of the first and second legs of the connector driven link thereby locking the connector driven link to the circular drive member, hence to the power source.

Accordingly, the connector driven link is positioned to rotate the circular drive member clockwise or counterclockwise about its rotational axis, upon extension or retraction of the piston rod within the piston/cylinder device.

In accordance with one aspect of the present invention, the degree of rotation of the circular drive member need only be limited. More specifically, rotation of the drive member through only a few degrees of rotation acts through the cam follower and camming groove and the length of the hinged driven links to produce resultant radial movement of each shoe of the device by a distance sufficient to move the shoes from their maximum retraction into the cage, to their maximum extension outside the cage (see FIGS. 2 and 3), where such shoes are in position to engage and grasp a cylindrical, round or similarly configured object. Due in major part to the mechanical structure of the various components of the present transfer ring, such as the use of the circular driven member, cam follower-camming groove combination, the present transfer ring is capable of using a relatively small power source for applying a substantially greater gripping force against a grasped object than heretofore has been obtainable with known prior art transfer rings employing even larger piston/cylinder power devices. Moreover, by reason of the limited motion of each element of the present transfer ring, and the minimized force experienced by the components of the present invention, there is reduced wear and tear upon the ring during use, thereby enlarging its anticipated life time. In one embodiment of the present transfer ring, those structural elements which are potentially subjected to frictional force, hence wear upon the element, are provided with a lubricative polymeric coating, such as Teflon™ to further extend the anticipated life time of the overall transfer ring.

Figure 2:
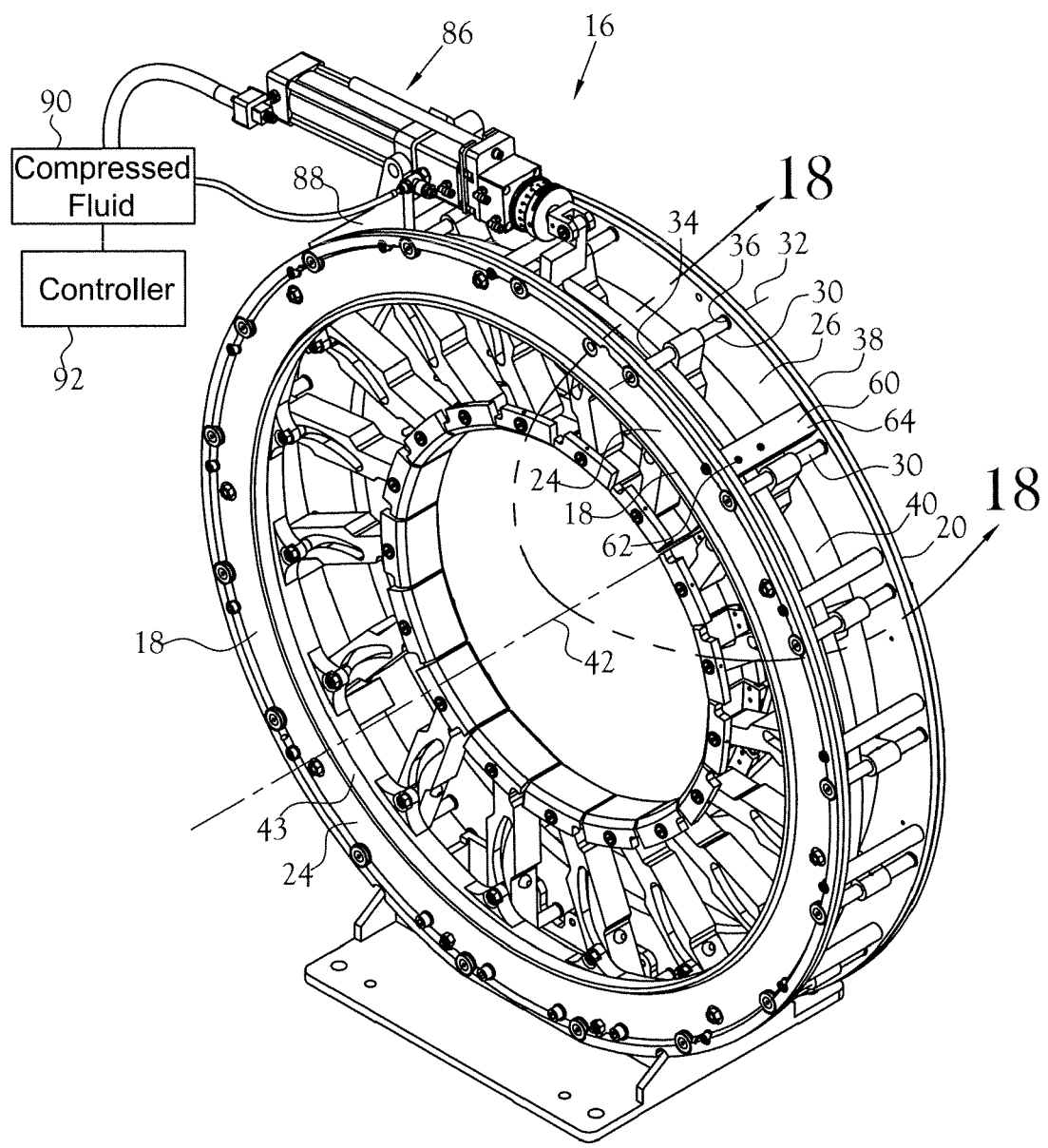
FIG. 2 is perspective view of one embodiment of a transfer ring in its expanded diameter attitude and depicting various aspects of the present invention.
Figure 3:
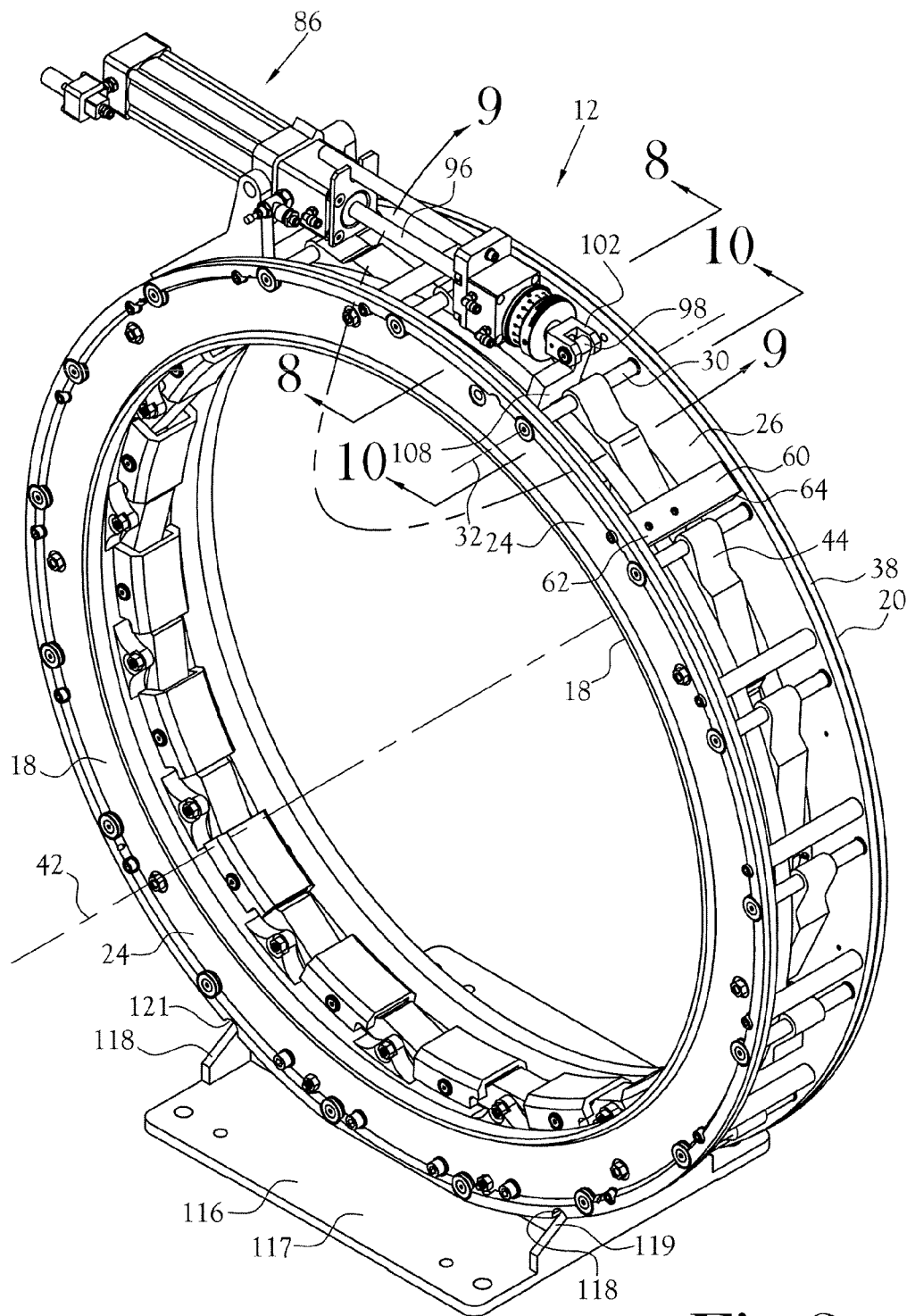
FIG. 3 is a perspective view of the transfer ring of FIG. 2 in its retracted diameter attitude.
Figure 4:
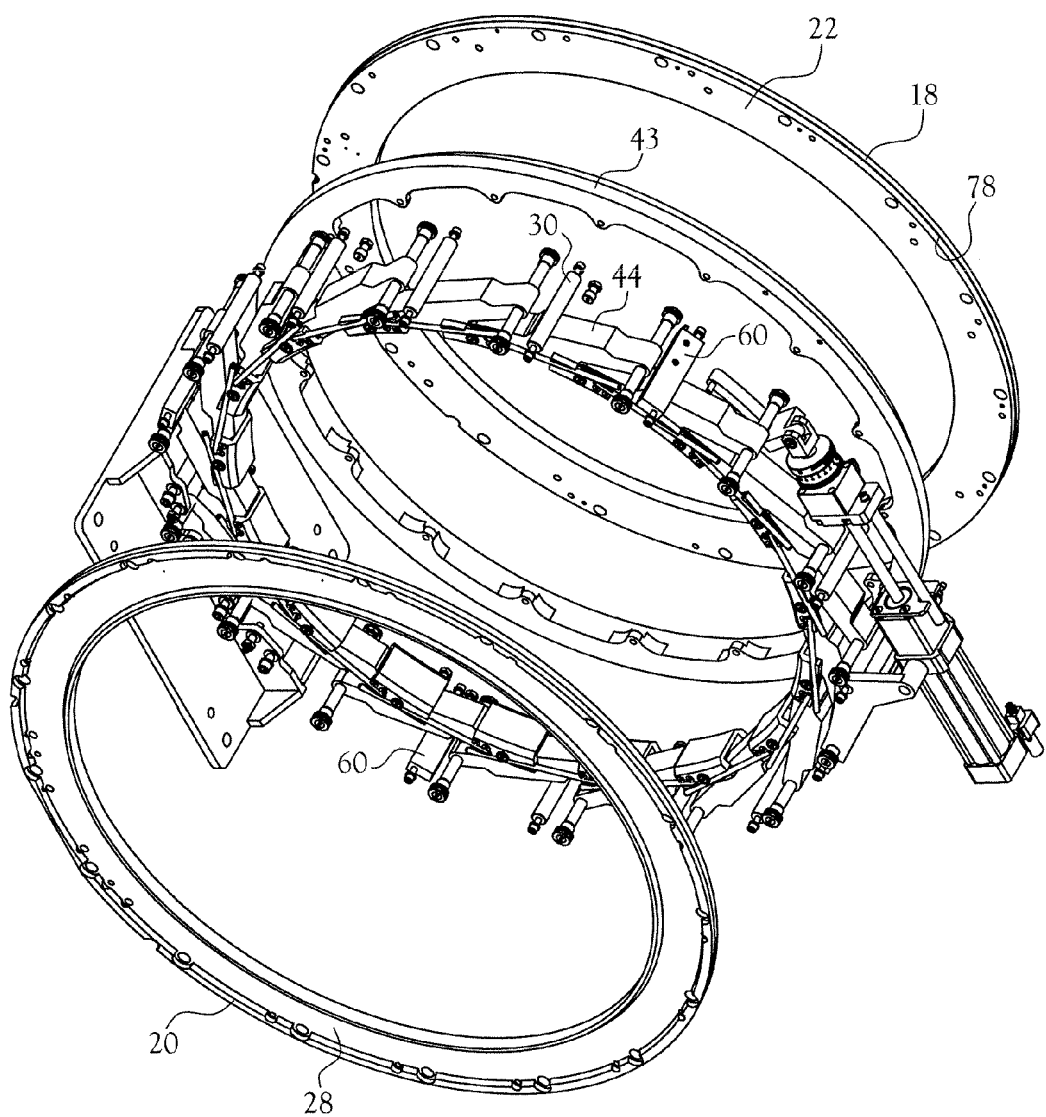
FIG. 4 is a partially exploded perspective view of one embodiment of a transfer ring of the present invention.

With reference to FIG. 2, a mount 116 for the cage is provided. The depicted mount includes a base plate 117 having first and second upstanding side walls 118, 119 which are adapted to support the cage while providing for at least limited rotational movement of the circular drive member within the cylindrical skeletal cage and relative to the first and second circular frame members and about the common central axis of the cage and the circular frame members.

As depicted in FIG. 5, in one embodiment of a mount for the cage, respective outboard edge portions, 124, 125 of the outboard edges of the side walls are cutaway to provide clearance for the circular drive member to rotate relative to the side walls of the mount.

In one embodiment, the method of the present invention for the transfer of an object having at least a girth portion thereof which requires substantially continuous support for the object in the course of such transfer, comprises the steps of interconnecting one end of each of a plurality of elongated hinged links within an open space defined internally of a circular skeletal cage proximate the outer periphery of the cage, an opposite outboard end of each of a plurality of elongated hinged links being free floating and having mounted thereon an articulating shoe having an outer surface suitable for forming a portion of a collectively defined substantially circular grasping geometry, defining a preferably curved camming groove in a side surface of the each of the plurality of elongated hinged links, mounting within the open space of the cylindrical skeletal cage, a circular drive member, having a rotational axis coincident with the central axis of the skeletal cage, operatively interconnecting the circular drive member with the plurality of elongated hinged links by means of a plurality of cam followers interposed between the circular drive member, and the camming grooves, encircling the object proximate the girth thereof with the shoes mounted on the links, adjusting the rotational position of the circular drive member whereby the plurality of links are rotated about their hinged ends, thereby moving the shoes radially inwardly or outwardly of the cage as a function of the direction and extent of rotation of the circular drive member acting through the cam-followers, camming grooves and the elongated links with resultant grasping or releasing of the object encircled by the shoes.

As depicted in FIG. 18, in one example the transfer ring 16 of the present invention may be employed to grasp the outer circumference 150 of a belt and tread package 152 of a vehicle tire and transfer such package in encircling relationship to a green tire carcass 154 which is disposed on a shaping expansion drum 14 (See FIG. 1). Once the belt and tread package is disposed in its desired encircling relationship to the tire carcass, inflation of the tire carcass is employed to marry the belt and tread package to the tire carcass, all as is well known in the art.

It will be recognized that in the foregoing example, inflation of the tire carcass expands the carcass radially outwardly, creating a substantially large radial force (arrows 156 FIG. 18) against the plurality of shoes which are collectively forming the grasping surface 41 of the transfer ring. For the marrying of the belt and tread package to the carcass to be successful, it is important that the belt and tread package be restrained against radial movement of such package relative to the underlying carcass for a time sufficient for the completion of the marrying of the belt and tread package to the carcass. Such marrying make take various forms, but in all instances, the concentricity of the belt and tread package relative to the underlying carcass must both be maintained uniform about the circumference of the carcass and the forces applied by the expanding carcass against the belt and tread package, hence against the plurality of shoes of the transfer ring, must be uniformly resisted by the transfer ring, all without alteration of the selected inner diameter of the transfer ring.

As noted, the forces (156 FIG. 18) exerted by the expanding carcass during the marrying process may be very large. In the prior art, such large forces commonly have been accommodated by providing a relatively large power source for retaining the shoes of the transfer ring radially inwardly positioned during the marrying of the belt and tread package to the carcass. Such larger power sources are relatively costly and tend to decrease the life time of the transfer ring due to exceptional friction and other forces experienced by the several elements of the transfer ring both during positioning of the shoes of the transfer ring and during the time when the elements of the transfer ring are being stressed by the expanding forces generated by the carcass. One consequence of the use of such larger power sources is the need for using costly stronger and/or larger sizes of materials in the construction of the transfer ring.

Figure 19:
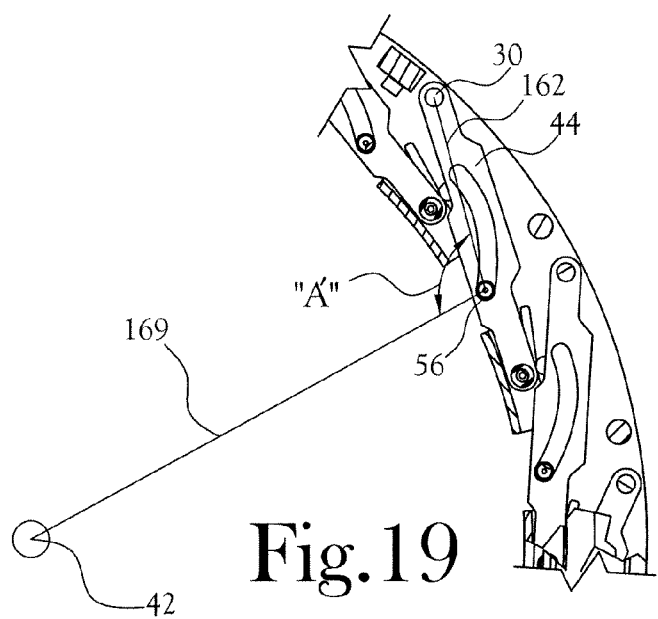
FIG. 19 is a partial cutaway side view of a portion of the transfer ring depicted in FIG. 6 taken generally along the line 19-19 of FIG. 6.

With specific reference to FIGS. 18 and 19, it will been seen that in the present invention, the geometrical relationship between the driven link 44 (and its attached shoe 37), the hinge pin connector 30 of the outboard end 50 of the driven link, the cam follower 56 associated with the limitedly rotatable cylindrical drive member 43 mounted internally of the skeletal cage 38 and the camming groove 54 associated with the driven link cooperatively function to effect radial movement of the shoe of each driven link, hence the development of a collectively defined inner diameter grasping surface 41 of the transfer ring. In the present invention, during those time intervals where the transfer ring is merely grasping, supporting and relocating a belt and tread package onto a carcass, the movement of the shoes of the transfer ring are moved with relatively small forces between their respective radially inward positions of defining a "closed grasping inner diameter surface (FIG. 18) and their respective radially outward positions where the shoes are withdrawn (FIG. 19) from the engagement with an object.

To this end, as depicted in FIGS. 18 and 19, the movement of each shoe is substantially effected by its own linkage module 158, the linkage modules of the several shoes being interconnected for simultaneous uniform movement, both with respect to speed, direction and extent of their movement.

FIG. 18 schematically depicts a typical linkage module 158 for a shoe. In the depicted embodiment, each module includes a driven link 44 which has its outboard end 50 hingedly mounted about a connector pivot pin 30 which enjoys a fixed location between the first and second frame members of the transfer ring and proximate the outer peripheries of these frame members. For clarity, only a second frame member 20 is shown in FIG. 18. As so mounted, the inboard end 48 of the driven link is free floating when the driven link is rotated about its hinged mounting.

Further, each driven link includes a contoured (i.e. curved) camming groove 54 extending along its length. This camming groove receives therein a respective cam follower 56 which projects into the camming groove from the inside surface of the cylindrical drive member which is rotatably mounted within the skeletal cage. In one embodiment, seventeen such modules are provided about the circumference of the skeletal cage. The multiple modules are interconnected as described hereinabove by means of one or more physical features of the shoes, rigid rod 57 and the inboard ends of the driven links.

In the depicted embodiment, the skeletal cage is fixedly mounted on a mount 116 which may be employed to secure the transfer ring on a tire making machine, for example. The cylindrical drive member, however, is mounted for limited clockwise or counterclockwise rotation within the fixed cage by means of the power source 86 which is mounted on the cage and operatively linked to the cylindrical drive member.

In operation, actuation of the power source in a first direction functions to rotate the cylindrical drive member clockwise about the central axis 42 of the cage. Reversal of the power source functions to rotate the cylindrical drive member counterclockwise within the cage.

Figure 17:
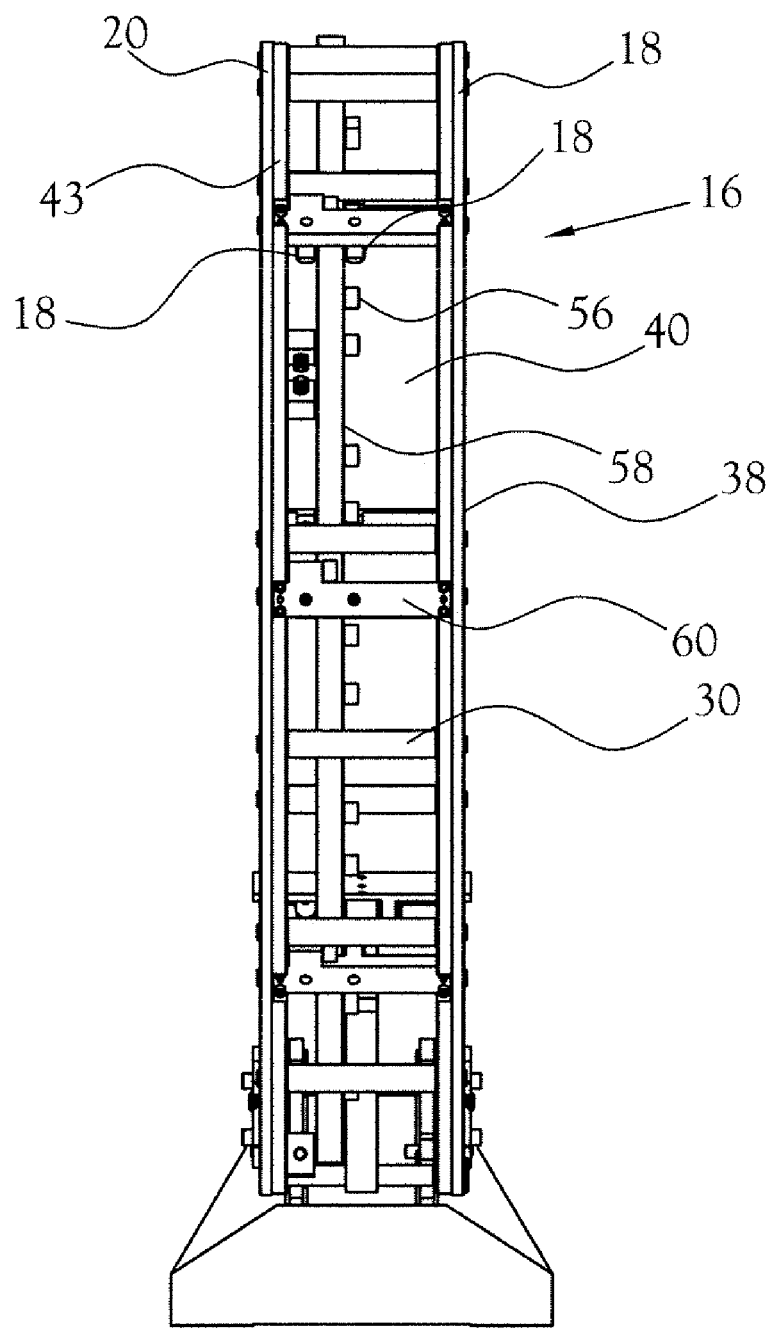
FIG. 17 is a side elevation view of the transfer ring depicted in FIG. 2 with various elements omitted for clarity of depicting the spatial relationship of the cage-defining frame members of the depicted embodiment of the present invention.

Rotation of the cylindrical drive member functions to move the cam followers mounted on, and projecting from the inside surface of the cylindrical drive member, along a circular path 160 about the central axis of the cage. In turn, these cam followers, being in physical engagement with the camming groove of their respective driven link slide along such groove as a function of the extent of the rotational movement of the cam followers. Inasmuch as the cam followers are moving along a circular path about the central axis of the cage, and each of their respective driven links is hinged for movement of the outboard end 50 of the driven link about the hinge pin connector 30 (see arrow "C") for the driven link, the rotational movement of the circular drive member and its cam followers in clockwise direction (see FIGS. 18 and 19), functions to move the cam follower from a radially outwardmost position within its camming groove, along the groove, toward its inwardmost position within its camming groove. As depicted in FIGS. 16 and 17, this movement of inboard end of the drive link results in radially inward movement of the shoe associated with the driven link.

As seen in FIG. 18, when the rotational position of the cam follower of a given linkage module is disposed outermost of the camming groove of its respective driven link, the angle "A" defined between the force line 162 between the hinge point of a driven link to its respective cam follower, and the force line 169 between this cam follower and the central axis 42 of the cage, (FIG. 18), is materially greater than this same angle "A" (FIG. 19) defined when the cam follower of the given linkage is disposed innermost within its respective camming groove. The resultant of this geometrical arrangement is to so position the driven links that the force applied to the driven link by the expanding tire carcass is in a substantially straight line (i.e., in a radial direction) when the force applied to the driven link by the expanding carcass is maximum, thereby minimizing the restrictive requirements for the power source. Contrariwise in the present invention, when during operations of the present invention, there no longer is need for the transfer ring to be exerting a grasping force or resisting a radially outward force, movement of the cylindrical drive member in a clockwise direction returns the driven links to their radially outermost positions, a function which requires relatively small power from the power source. The present invention, therefore, may employ a power source of relatively lesser cost and which exerts lesser frictional forces upon the several moving elements of the plurality of linkage modules, etc.

Figure 21:
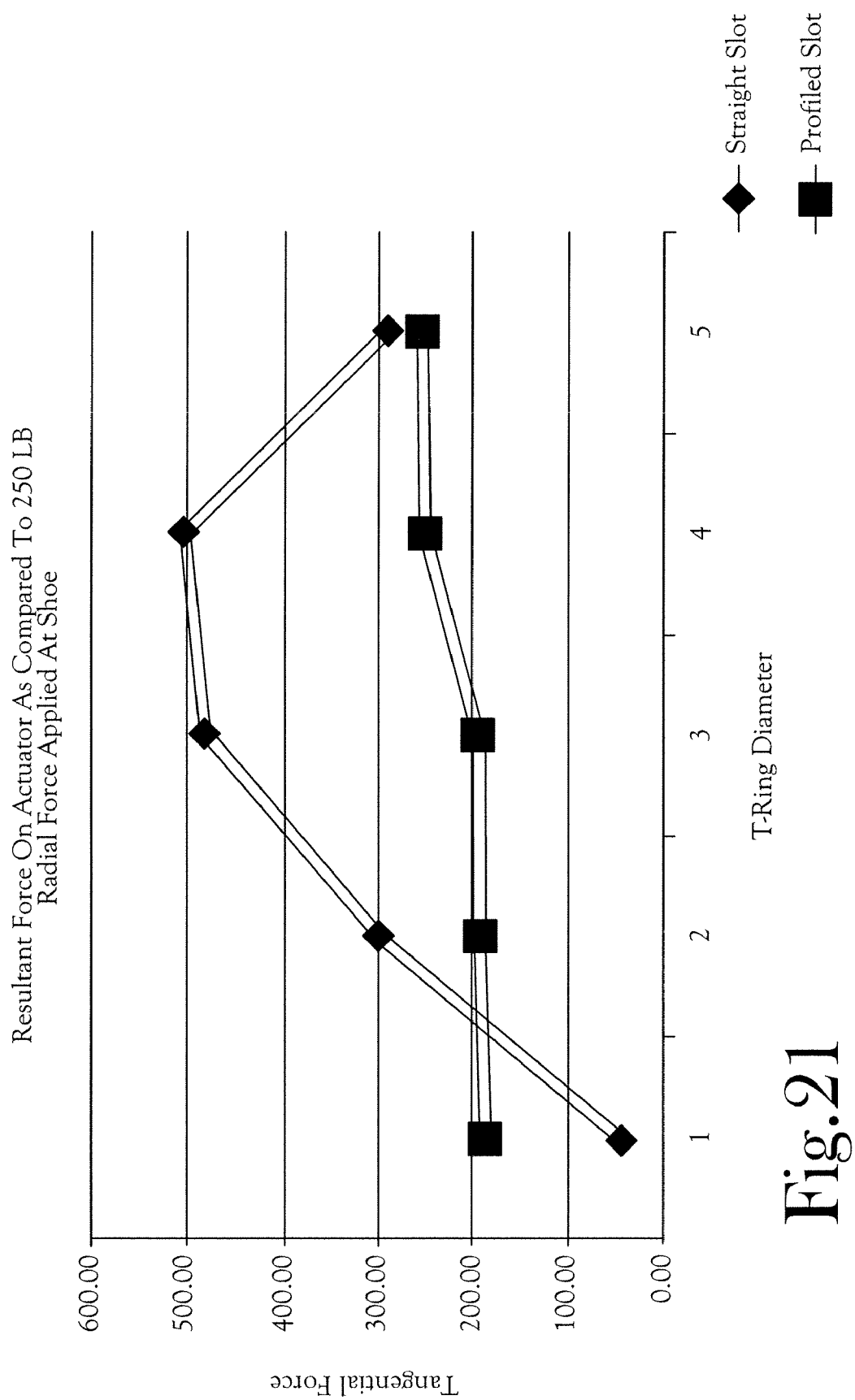

FIG. 21 geographically displays the resultant force on the activator (i.e., power source) of a straight camming groove and the present curved camming groove of the present inventions when a 250 pound radial force is applied to the shoes of the transfer ring. In FIG. 21, it will be noted that the present invention materially lessens the radial force which must be resented by the power source of the present invention.

Figure 20:
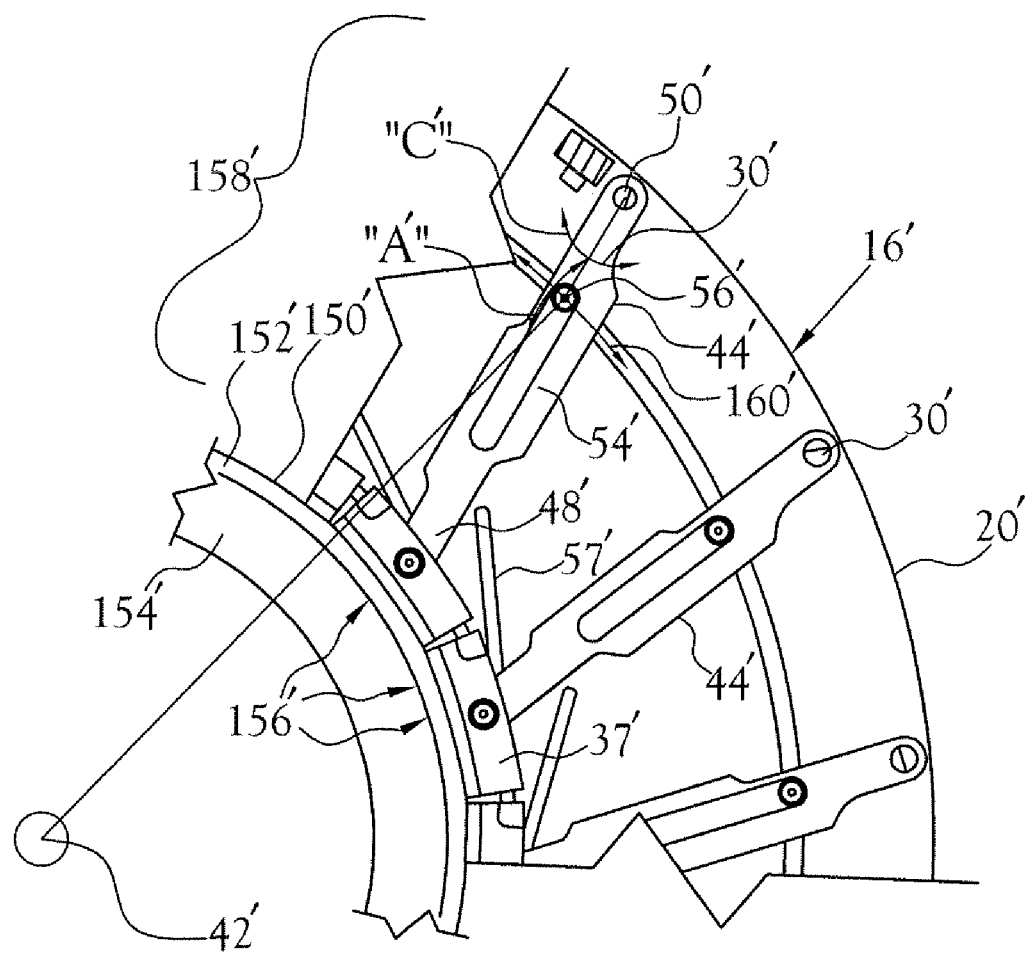
FIG. 20 is a partial cutaway side view as depicted in FIG. 19, but employing a non-curved camming groove; and, FIG. 21 is a chart comparing the forces experienced by a power source during operation of a transfer ring having straight camming grooves and a transfer ring of the present invention having curved camming grooves (See FIGS. 2, 3, and 17).

FIG. 20 depicts one embodiment of the present invention employing a straight camming groove on each of the driven links. Like components of the embodiment of FIG. 18 are designated with primed numerals in FIG. 20. Whereas this embodiment is useful for enhancing the speed at which the driven links of a transfer ring of the present invention may be increased, employing a given power source, as depicted in FIG. 21, the straight camming groove embodiment of FIG. 20 will require a more powerful power source for resisting a given radial pressure.

While the present invention has been illustrated by description of several embodiments and while the illustrative embodiments have been described in considerable detail, it is not the intentions of the applicant to restrict or in any way limit the scope of the appended claims to such detail. Additional advantages and modifications will readily appear to those skilled in the art. The invention in its broader aspects is therefore not limited to specific details, representative apparatus and methods, and illustrative examples shown and described. Accordingly, departure may be made from such details without departing from the spirit or scope of applicant's general inventive concept.

What is claimed is:

1. A transfer ring comprising first and second circular frame members disposed in fixed side by side registered and spaced apart relationship to one another, a plurality rigid hinge pin connectors extending between said first and second circular frame members, each hinge pin connector having a longitudinal centerline, first and second opposite ends and being of a length adapted to rigidly maintain said side by side registered and spaced apart relationship of said first and second circular frame members, and first end of each of said hinge pin connectors being mounted in said first circular frame member at respective spaced apart locations about the outer perimeteral margin of said first circular frame member, and said second end of each of said hinge pin connectors being mounted in said second circular frame member at selected spaced apart locations about the outer perimeteral margin of said second frame member, said space apart locations on said first circular frame member being in register with said spaced apart locations on said second circular frame member thereby defining a substantially rigid circular skeletal cage having a central axis and an annular substantially open space defined therebetween, a circular drive member disposed within said annular substantially open space and in side by side relationship to said first circular frame member, said circular drive member having a central rotational axis which is disposed coincident with said central axis of said cage, said circular drive member including a plurality of equally spaced apart cam followers fixedly mounted thereon and projecting therefrom in a direction inwardly of said circular skeletal cage, a plurality of driven links disposed within said substantially open space of said circular skeletal cage, each driven link being of an elongated geometry, and having a longitudinal center line and an outboard end thereof hingedly mounted on a respective hinge pin connector which extends between said first and second frame members, and a second opposite free-floating inboard end adapted to move generally radially in and out of the annular open space defined between said first and second frames members when said driven links within said skeletal cage are swung about their respective hinge pin connector, each of said driven links including at least a first outer surface facing inwardly of said circular skeletal cage in a direction away from said second frame member and terminating proximate said circular drive member, each of said driven links including an elongated camming groove defined along at least a portion of the length of said first side surface of each of said driven links, said camming groove being adapted to operatively receive therein at least one of said cam followers disposed on said circular drive member, a plurality of shoes, each having an outer surface facing substantially radially inwardly of said skeletal cage, one of each such shoes being articulatingly mounted on said inboard end of a respective one of said elongated driven links by a corresponding pivot pin, each said shoe being carried substantially radially inwardly or outwardly upon hinged rotation of said driven links about the longitudinal centerline of its respective pivot pin, a power source associated with said transfer ring, said power source being operatively connected to said circular drive member for at least limited oscillating rotation of said circular drive member relative to said cage upon actuation of said drive member, whereby rotational movement of said circular drive member moves said cam followers about a circular path within said skeletal cage, said circular path having a rotational axis which coincident with said central axis of said cage, and further moves respective inboard ends of associated ones of said driven links radially inwardly or outwardly of said skeletal cage and resultant decrease or increase of the diameter of a substantially circular grasping surface collectively defined by said shoes, as a function of the extent and direction of rotational movement of said central drive member, and whereby said rotational movement of said circular drive member, acting through said cam followers and their associated camming grooves in said driven links effects rotation of each of said driven links about the longitudinal axis of its respective hinge pin connector and resultant movement of said shoes radially inwardly and outwardly of said skeletal cage as a function of the extent and direction of rotational movement of said circular drive member.

2. The transfer ring of claim 1 and including means interconnecting adjacent ones of said shoes to one another in a manner wherein all of said shoes articulate about their respective mountings to respective ones of said driven links substantially in unison of speed, direction and extent of movement of said shoes radially inwardly and outwardly relative to said circular skeletal cage.

3. The transfer ring of claim 2 wherein said means interconnecting adjacent ones of said shoes to one another comprises an elongated opening defined in each of said shoes, and an elongated rod having a first end affixed in an opening in one of said shoes and extending therefrom to be slidably received within an elongated opening in an adjacent shoe, whereby movement of the shoe to which the rod is fixedly mounted effects corresponding like movement of that adjacent shoe to which the rod is slidingly mounted.

4. The transfer ring of claim 1 wherein each driven link is of a width dimensionally less than the spaced apart distance between said first and second frame members but of a sufficient width as to limit rotational movement of each such driven link about its respective longitudinal centerline.

5. The transfer ring of claim 2 and including friction reduction means disposed along each of said hinge pin connectors.

6. The transfer ring of claim 5 wherein said friction reduction means comprises a polymeric material.

7. The transfer ring of claim 1 wherein said cam followers are disposed on an inwardly facing first flat surface of said circular drive member and engage the elongated camming grooves of respective ones of said driven links.

8. The transfer ring of claim 1 wherein said first and second circular frame members comprise respective rings, each having opposite substantially flat inner surfaces.

9. The transfer ring of claim 1 wherein said first and second frame members are of substantially like inner diameters.

10. The transfer ring of claim 1 and including at least a first mount adapted to support said circular drive member within said cage for at least limited clockwise and counterclockwise rotational movements of said circular drive member within said circular cage and relative to said first and second circular frame members and about said common central axis of said cage and said circular frame member.

* * * * *